(12) United States Patent
Putz (10) Patent No.: US 11,686,357 B2
(45) Date of Patent: Jun. 27, 2023

(54) FLOATING-CALIPER BRAKE

(71) Applicant: VE VIENNA ENGINEERING FORSCHUNGS—UND ENTWICKLUNGS GMBH, Vienna (AT)

(72) Inventor: Michael Putz, Sebersdorf (AT)

(73) Assignee: VE VIENNA ENGINEERING FORSCHUNGS—UND ENTWICKLUNGS GMBH, Vienna (AT)

( * ) Notice: Subject to any disclaimer, the term of this patent is extended or adjusted under 35 U.S.C. 154(b) by 414 days.

(21) Appl. No.: 17/050,266

(22) PCT Filed: Apr. 18, 2019

(86) PCT No.: PCT/AT2019/060132
§ 371 (c)(1),
(2) Date: Oct. 23, 2020

(87) PCT Pub. No.: WO2019/204843
PCT Pub. Date: Oct. 31, 2019

(65) Prior Publication Data
US 2021/0231179 A1 Jul. 29, 2021

(30) Foreign Application Priority Data

Apr. 25, 2018 (AT) .............................. A 50344/2018

(51) Int. Cl.
*F16D 55/22* (2006.01)
*F16D 55/227* (2006.01)
(Continued)

(52) U.S. Cl.
CPC ....... *F16D 55/227* (2013.01); *F16D 65/0056* (2013.01); *F16D 65/0068* (2013.01);
(Continued)

(58) Field of Classification Search
CPC .............. F16D 55/227; F16D 65/0056; F16D 65/0068; F16D 65/0087; F16D 65/18; F16D 2055/0008; F16D 2055/0029
See application file for complete search history.

(56) References Cited

U.S. PATENT DOCUMENTS

| 4,036,330 A | 7/1977 | Henning et al. |
| 4,193,481 A | 3/1980 | Wunderlich |

(Continued)

FOREIGN PATENT DOCUMENTS

| DE | 31 14 047 | 10/1982 |
| DE | 10 2012 006 111 | 9/2013 |

(Continued)

OTHER PUBLICATIONS

Austria Search Report conducted in counterpart Austria Appln. No. A 50344/2018 (dated Oct. 5, 2018).

(Continued)

*Primary Examiner* — Nicholas J Lane (57) ABSTRACT

The aim of the invention is to ensure a reliable lift of both brake pads of a floating-caliper brake (1) after releasing the brake. This is achieved in that a lifting part (20) is hinged to the brake caliper (2) at a hinge point (21), and the lifting part (20) is supported on the support structure (7) at a contact point (23) at least partly at releasing the floating-caliper brake (1), wherein a lift drive (22) is provided which rotates the lifting part (20) about the hinge point (21) such that a support for the lifting part (20) is produced on the contact point (23), whereby the hinge point (21) and the brake caliper (2) are moved.

8 Claims, 3 Drawing Sheets

(51) Int. Cl.
 *F16D 65/00* (2006.01)
 *F16D 65/18* (2006.01)
 *F16D 55/00* (2006.01)
(52) U.S. Cl.
 CPC ......... *F16D 65/0087* (2013.01); *F16D 65/18* (2013.01); *F16D 2055/0008* (2013.01); *F16D 2055/0029* (2013.01)

(56) References Cited

U.S. PATENT DOCUMENTS

| | | | |
|---|---|---|---|
| 4,375,842 A | 3/1983 | Melinat | |
| 4,382,491 A | 5/1983 | Chun | |
| 4,444,296 A | 4/1984 | Marianu | |
| 6,286,635 B1 | 9/2001 | Tamor | |
| 6,397,983 B1 | 6/2002 | Roszman et al. | |
| 7,721,854 B1* | 5/2010 | Mackiewicz | F16D 55/22655 188/73.44 |
| 9,127,735 B2 | 9/2015 | Putz et al. | |
| 9,181,998 B2* | 11/2015 | Isono | F16D 65/0068 |
| 9,382,957 B2 | 7/2016 | Asen et al. | |
| 11,209,057 B2* | 12/2021 | Rankin | F16D 65/0972 |
| 2011/0278104 A1* | 11/2011 | Isono | F16D 55/22655 188/71.8 |
| 2012/0168264 A1* | 7/2012 | Putz | F16D 65/18 188/72.1 |
| 2015/0008078 A1* | 1/2015 | Asen | F16D 65/18 188/72.3 |
| 2018/0363715 A1 | 12/2018 | Baumgartner | |
| 2022/0299072 A1* | 9/2022 | Thomas | F16D 55/227 |
| 2022/0333654 A1* | 10/2022 | Lee | F16D 65/0075 |

FOREIGN PATENT DOCUMENTS

| | | |
|---|---|---|
| DE | 10 2016 103 187 | 8/2017 |
| EP | 2 644 926 | 10/2013 |
| EP | 2 433 025 | 9/2014 |
| EP | 3 269 992 | 1/2018 |
| EP | 3 269 993 | 1/2018 |
| EP | 3269993 A1 * | 1/2018 ............ B60T 13/741 |
| JP | 2011-58584 | 3/2011 |
| WO | 2010/133463 | 11/2010 |
| WO | 2014/139919 | 9/2014 |

OTHER PUBLICATIONS

Int'l Search Report conducted in Int'l Appln. No. PCT/AT2019/060132 (dated Jul. 17, 2019).

Int'l Written Opinion conducted in Int'l Appln. No. PCT/AT2019/060132 (dated Jul. 17, 2019).

* cited by examiner

FLOATING-CALIPER BRAKE

The present invention relates to a floating-caliper brake comprising a brake caliper floatingly mounted on a support structure of the floating-caliper brake, on which brake caliper a first brake pad and a pressing device are arranged, a second brake pad being arranged on the pressing device and the pressing device moving the second brake pad toward the first brake pad in order to actuate the floating-caliper brake and moving the second brake pad away from the first brake pad in order to release the floating-caliper brake.

Caliper brakes, especially as disk brakes, are very widespread and are used in particular in vehicles and machines. In the case of a floating-caliper brake as a known embodiment of a caliper brake, it is known that at least one brake pad is moved to the brake disk by means of a pressing device during braking. As soon as the brake pad comes into contact with the brake disk, the second, opposite brake pad is moved by the acting reaction forces and the floating mounting of the brake caliper until the two brake pads are in contact with the brake disk. Floating-caliper brakes have the general problem of moving back the brake pads after braking, since at least the brake pad without a pressing device can normally not be actively lifted off the brake disk. Only the brake pad actuated by the pressing device can be actively lifted off. It therefore often happens that, after braking, when the brake pads should be lifted off the brake disk, a brake pad is not or is not completely lifted off the brake disk. This means that a brake pad rubs against the brake disk after braking, which leads to increased wear (brake pad, brake disk) and losses. In a vehicle, power losses of typically 0.1 kW up to the region of a few kW per brake can occur. These resulting losses naturally also increase the required drive power and, in the case of a motor vehicle, also the fuel consumption. In the case of electric vehicles in particular, such a loss is a major problem, since such losses can significantly reduce the range of the vehicle.

In order to force the two brake pads to lift off the brake disk after braking, there are various approaches in the known prior art. In conventional, hydraulic floating-caliper brakes, the O-rings of the hydraulic piston are often used and the elasticity of the O-rings is used to actively pull back the hydraulic piston. However, this works firstly only on the piston side and secondly only as long as the O-ring is sufficiently elastic. However, the elasticity deteriorates over the course of the operating time of the brake. Irrespective of this, the brake pad can still stick to its stop in the brake caliper, or the brake caliper itself can jam, which renders moving back in this way with the aim of lifting both brake pads ineffective. Caliper brakes, in particular in vehicles, are operated in very harsh environments under a wide variety of environmental conditions, which leads to contamination, corrosion and other signs of wear and tear on brake parts. This is also one of the reasons why lifting off on both sides by means of the O-rings does not work, or only works to a limited extent.

Other approaches to lifting off on both sides use springs or other elastic elements for bringing back the brake to its initial position (resetting). An example of this is U.S. Pat. No. 4,193,481 A, in which an elastic sleeve is used which acts between the floating caliper and its guide. In U.S. Pat. No. 4,375,842 A, in turn, a friction ring is used between the hydraulic piston and hydraulic cylinder in the brake caliper. When the brake is released, the friction ring forces the brake pads to lift on both sides. A similar solution for an electromechanical friction brake can also be found in WO 2010/133463 A1. In EP 2 644 926 A1, a leaf spring is used for resetting, the leaf spring being arranged on the pad carrier and being supported on the disk guide. However, these solutions also have the problem of the lifting of both brake pads after braking not always being reliable.

JP 2011058584 A1 describes a caliper brake with a resetting mechanism. In order to be reset, a lever is rotatably mounted, one end of which is in contact with the driven brake pad carrier and the other end with the floating caliper. When the brake is released, the lever is rotated by pulling back the brake pad carrier such that the floating caliper having the brake pad arranged thereon is also pushed away from the brake disk. Although the brake pads can be reliably lifted in this way, the implementation can be complex practically, in particular the protection of the mechanism from the harsh environmental conditions in the vicinity of the caliper brake.

A caliper brake is known from EP 3 269 992 A1, in which a mechanism is provided in order to reliably lift the brake pads off the brake disk after braking. For this purpose, a coupling part is provided in the caliper brake, which part effects a mechanical positive coupling between a movable brake part (floating caliper) and a stationary brake part. This coupling part is driven by an actuation unit when the brakes are released such that the movable brake part is moved relative to the stationary brake part due to the mechanical positive coupling, whereby the brake pads can be lifted reliably. Although the brake pads can be reliably lifted in this way, the implementation can be complex practically, in particular the protection of the mechanism from the harsh environmental conditions in the vicinity of the caliper brake.

Therefore, an object of the present invention is that of ensuring, in a simple and easy-to-implement manner, a reliable lifting of both brake pads of a floating-caliper brake after releasing the brake.

According to the invention, this object is achieved in that a lifting part is hinged to the brake caliper at a hinge point, and the lifting part is supported on the support structure at a contact point at least partly at releasing the floating-caliper brake, and in that a lift drive is provided which rotates the lifting part about the hinge point such that a support for the lifting part is produced on the contact point, whereby the hinge point and the brake caliper are moved. The resulting support at the contact point of the lifting part on the support structure ensures that, when the floating-caliper brake is released, the brake caliper is moved relative to the support structure, as a result of which the first brake pad arranged on the brake caliper is forcibly lifted off the brake disk. In this way it can be ensured that when the floating-caliper brake is released, both brake pads are reliably lifted off the brake disk. By arranging the lifting part at the hinge point on the brake caliper, this lifting mechanism can be integrated very easily into the floating-caliper brake and also easily and securely enclosed from the influences of the outside world, such as moisture, dirt, ice and snow, etc.

When the floating-caliper brake is actuated, the lifting part preferably abuts the support structure at the contact point until the floating-caliper brake is completely released. In this way, the lifting part can be centered on the support structure when the brake pads are abutting it, and a controlled, desired lifting amount can be achieved from this position.

The lifting mechanism can be implemented particularly easily when, during actuation and release, the lifting part abuts the support structure at the contact point, whereas the contact point being moved on the support structure when the floating-caliper brake is actuated. In that way, it is not necessary to lift the lifting part from the support structure during certain phases of braking.

In order to achieve an even, reliable lifting of both brake pads, a plurality of lifting parts can be arranged on the brake caliper, which parts each abut the support structure at a contact point and are actuated by one or more lift drives. In this way, possible tilting and jamming of the brake caliper can be prevented in a simple manner.

In a particularly advantageous embodiment, a lifting part is hinged to the brake caliper at two hinge points, and each end of the lifting part is supported on the support structure at a contact point at least partly at releasing the floating-caliper brake, whereas the lift drive rotating the lifting part about the two hinge points. In this way, using a single bow-shaped lifting part and a lift drive, a uniform, reliable lift of both brake pads can be implemented.

It is particularly advantageous if the pressing device is also used as a lift drive because then only a single drive is required for actuating and for lifting the brake pads. The necessary movement for the lifting part can be applied directly by the pressing device, or by the pressing drive of the pressing device, or can also be derived therefrom, for example by means of suitable gears, cams, etc.

In the following, the present invention will be explained in greater detail with reference to FIGS. 1 to 5, which show advantageous embodiments of the invention in an exemplary, schematic and non-limiting manner. In the figures.

A floating-caliper brake 1 substantially consists of a floatingly mounted brake caliper 2, on which a first brake pad 4, usually rigid (i.e. not movable relative to the brake caliper 2 but replaceable if necessary), is arranged, and a pressing device 6, on which a second brake pad 5 (replaceable if necessary) is arranged. The two brake pads 4, 5 interact with a brake disk 3 in order to brake. The second brake pad 5 can be moved relative to the brake caliper 2 by the pressing device 6, in particular the second brake pad 5 can be moved toward the first brake pad 4 or away from it. The floating-caliper brake 1 is used to brake a translational movement (e.g. in the case of an elevator brake or a machine part which is moved linearly) or rotational movement (e.g. a rotary movement of a vehicle wheel or a rotating machine part). For this purpose, the two brake pads 4, 5 are pressed against the brake disk 3 by means of the pressing device 6, as result of which a braking effect (braking force or braking torque) is produced. In the context of the invention, brake disk 3 is understood to mean any friction surface that interacts with the brake pads 4, 5 in order to achieve a braking effect. A relative movement (rotation, translation) occurs between the friction surface and the brake pads 4, 5, which movement is braked by means of the floating-caliper brake 1. Usually either the brake disk 3 is moved and the floating-caliper brake 1 is substantially stationary (e.g. as in the case of a vehicle wheel) or the brake disk 3 is stationary and the floating-caliper brake 1 is moved relative to the brake disk 3 (e.g. as in an elevator brake).

The floating-caliper brake 1 is arranged on a support structure 7. Using the example of a vehicle, the support structure 7 would be arranged, for example, on the wheel mounting and the brake disk 3 would non-rotatably be connected to the wheel hub and would rotate therewith. Using the example of an elevator brake, the support structure 7 would be attached to the elevator car and the brake disk 3 would be a friction surface arranged in the elevator shaft. In relation to the floating-caliper brake 1 or its movable components, the support structure 7 is stationary.

The brake caliper 2 of the floating-caliper brake 1 is arranged so as to be movably mounted in a caliper guide 9 transversely to the relative movement between the brake disk 3 and the brake pads 4, 5. The caliper guide 9 allows the brake caliper 2 to move transversely (indicated by the double arrow in FIG. 1) and at the same time prevents the brake caliper 2 from being moved together with the rotating brake disk 3 by the frictional forces that occur during braking. As a result of the transverse movement, the two brake pads 4, 5 can be moved toward or away from one another. The caliper guide 9 can be part of the support structure 7 or can be arranged on the support structure 7. In the exemplary embodiment shown, the caliper guide 9 is designed as a guide pin 8 on the support structure 7. A guide hole 10 is provided on the brake caliper 2, into which the guide pin 8 is inserted, as a result of which the brake caliper 2 is movably mounted on the guide pin 8. By guiding the guide hole 10 on the guide pin 8, the brake caliper 2 can carry out the transverse movement. The caliper guide 9 is preferably protected from external contamination and other external influences. For example, a guide pin 8 of the caliper guide 9 can be well protected against dirt by folding bellows and/or seals. Of course, other designs of a caliper guide 9, such as guide surfaces, are also possible.

The pressing device 6 is arranged on the brake caliper 2, and therefore the pressing device 6 is also supported on the support structure 7. In the case of the floating-caliper brake 1, the second brake pad 5 is therefore moved, in a known manner, on the pressing device 6 toward the first brake pad 4 by the pressing device 6 of the caliper brake 1 and is therefore pressed against the brake disk 3. The resulting reaction forces move the brake caliper 2 having the first brake pad 4 arranged thereon in the caliper guide 9 until the two brake pads 4, 5 abut the brake disk 3 and, upon further actuation, a braking effect (braking force, braking torque) is generated. The actuation can of course also be carried out in such a way that the brake caliper 2 together with the first brake pad 4 are moved to the brake disk 3 by the pressing device 6 first and only then is the second brake pad 5 moved. Naturally, the brake disk 3 is arranged between the two brake pads 4, 5.

The second brake pad 5 can also be arranged on a holding part 11, whereas the holding part 11 being moved by the pressing device 6. A wear adjuster 12 can also be provided in order to compensate in well-known manner for any wear on the brake pads 4, 5 and/or on the brake disk 3. As is well-known, using the wear adjuster 12, the air gap L between the lifted brake pad 5 and the brake disk 3 can be changed, in particular an air gap L, which increases while operating the floating-caliper brake 1, can be reduced again. In the exemplary embodiment shown, the wear adjuster 12 is arranged between the pressing device 6 and the second brake pad 5 or holding part 11. The wear adjuster 12 could, however, be arranged in the same way between the pressing device 6 and the brake caliper 2. Of course, the floating-caliper brake 1 can also be designed without a wear adjuster 12. The specific implementation of the wear adjuster 12 is irrelevant to the invention, which is why it is not discussed in more detail.

How the pressing device 6 is specifically designed to actuate the floating-caliper brake 1 is also irrelevant to the present invention. The pressing device 6 can comprise a pressing drive 13 which moves a pressing part 14 of the pressing device 6. The second brake pad 5 is in turn moved by means of the pressing part 14, possibly via a holding part 11 and/or a wear adjuster 12. In order to actuate the floating-caliper brake 1, a movable pressing part 14 driven by the pressing drive 13 is therefore moved in order to move the brake disks 4, 5 toward the brake disk 3 or away from the brake disk 3. Depending on the design of the floating-caliper brake 1, the movable pressing part 14 moves at least the second brake pad 5 and optionally also a holding part 11 and/or a wear adjuster 12. The pressing drive 13 can be hydraulic, pneumatic or electromechanical. Electromechanical designs of the pressing device 6, e.g. as described by the applicant in EP 2 433 025 B1 or WO 2014/139919, are particularly preferred.

When the floating-caliper brake 1 is actuated, the two brake pads 4, 5 are pressed, in a known manner as described above, with the pressing device 6 against the brake disk 3, as a result of which a braking effect is generated by the applied pressing force, for example in the form of a braking torque. When the floating-caliper brake 1 is released, the pressing device 6 lifts the second brake pad 5 arranged thereon from the brake disk 3. A fundamental, known problem of a floating-caliper brake 1 is that the first brake pad 4 is not or is not entirely lifted off the brake disk 3 together with the second brake pad 5 when the caliper brake 1 is released, but only the actively moved second brake pad 5. Due to the continuing contact between the first brake pad 4 and the brake disk 3, a loss occurs in the brakeless state, which has to be covered by the drive of the braked device (e.g. a vehicle). These losses lead to an undesirable increase in consumption of the drive (e.g. fuel or electrical energy). This also increases the wear on the brake disk 3 and the first brake pad 4, which is also undesirable.

Figure 1:
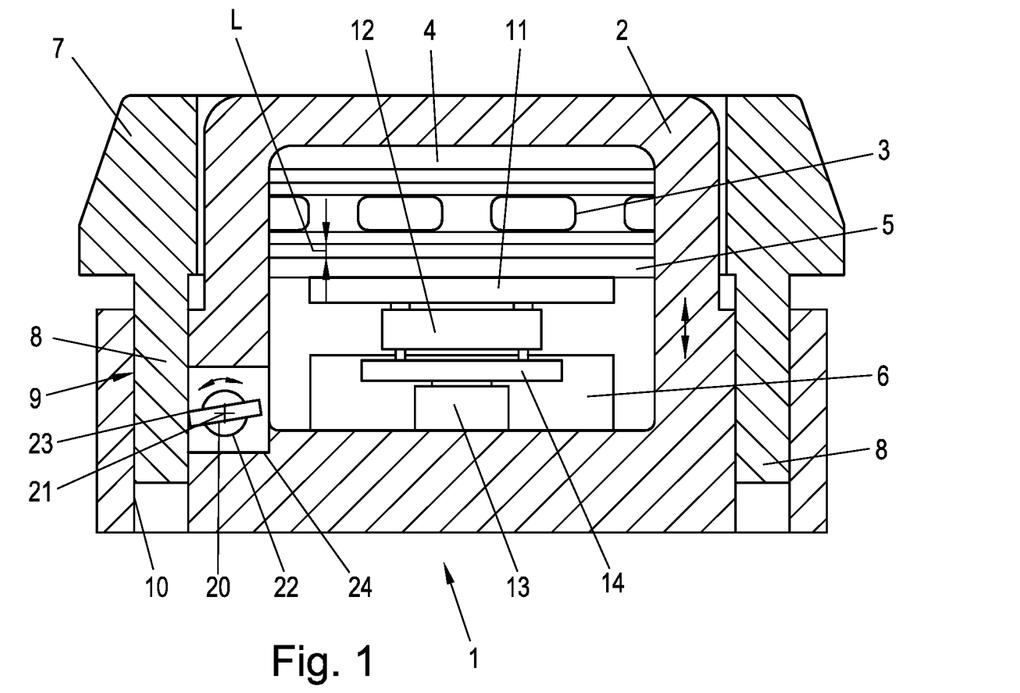
FIGS. 1 and 2 show a floating-caliper brake according to the invention having a lifting part and FIGS. 3 to 5 show the function of the lifting part on the basis of an advantageous embodiment of the lifting part.

To counteract this, a lifting part 20 is provided according to the invention, which is rotatably hinged to the brake caliper 2 at a hinge point 21, as a result of which the hinge point 21 and the lifting part 20 are moved together with the brake caliper 2. The lifting part 20 extends from the hinge point 21 to a part of the support structure 7 of the floating-caliper brake 1 and abuts it at a contact point 23. At the contact point 23, no mounting or hinge is provided between the lifting part 20 and the support structure 7, but rather there is merely a touching contact between the lifting part 20 and the support structure 7. This contact can also be cancelled and established as necessary. The location of the contact point 23 on the support structure 7 can also be varied. In the embodiment shown in FIG. 1, the lifting part 20 abuts the guide pin 8 of the caliper guide 9. A lift drive 22 is also provided, which can rotate the lifting part 20 about the hinge point 21, as indicated in FIG. 1. The function of this lifting part 20 is explained below.

During braking, the brake caliper 2 together with the first brake pad 4 is moved against the brake disk 3 at some point, as described above. The lifting part 20, which is hinged at the hinge point 21, is thus moved together with the brake caliper 2. The lifting part 20 is thus moved relative to the support structure 7, here the caliper guide 9. Due to the actuating forces acting for the braking, the contact point 23 on the support structure 7 is also moved. In the exemplary embodiment according to FIG. 1, the contact point 23 together with the brake caliper 2 would move slightly downward. The lifting part 20, or the contact point 23, is thus centered on the support structure 7 in a position in which the two brake pads 4, 5 abut the brake disk 3.

After braking, the second brake pad 5 moved with the pressing device 6 is moved away from the brake disk 3 in order to release the floating-caliper brake 1. In this case, however, the brake caliper 2 together with the first brake pad 4 and the hinge point 21 is not forcibly or not sufficiently moved. In order to also lift the first brake pad 4, which is arranged on the brake caliper 2, from the brake disk 3, the lift drive 22 is actuated such that a non-positive or positive connection between the lifting part 20 and the support structure 7 occurs at the contact point 23. This creates a support for the lifting part 20 on the support structure 7 at the contact point 23, which support is stationary with respect to the support structure 7, and the brake caliper 2 is moved in the transverse direction by the lifting part 20 via the hinge point 21, in the embodiment according to FIG. 1 it is moved upwards. As a result, the first brake pad 4 connected to the brake caliper 2 also lifts off the brake disk 3.

In the exemplary embodiment according to FIG. 1, the lifting part 20 would be rotated counterclockwise. Due to a frictional locking (frictional coupling), a support is created at the contact point 23 of the lifting part 20 on the support structure 7 (here on the guide pin 8 of the caliper guide 9). The support is therefore stationary relative to the support structure 7 and when the lifting part 20 is rotated further counterclockwise, the hinge point 21 is forcibly moved in the transverse direction—in the exemplary embodiment according to FIG. 1, upward. In this way, the brake caliper 2 together with the first brake pad 4 is forcibly lifted off the brake disk 3.

In a real embodiment of the lifting part 20, a certain rolling movement of the lifting part 20 on the support structure 7 will always take place at the contact point 23, for example because the lifting part 20 will have a certain rounding at the end. In the context of the invention, such a small rolling movement is still understood to be stationary relative to the support structure 7. A kind of transmission ratio can even be implemented. If the lifting part 20 abuts the support structure 7 via an elevation curve and the elevation curve rolls on the support structure 7 when the lifting part 20 is rotated, the rotational movement of the lifting part 20 can be translated into a desired translational movement of the brake caliper 2. However, such a rolling movement is also understood to be stationary within the meaning of the invention, because a support for the lifting part 20 occurs at any time at the current contact point 23.

Instead of a frictional locking at the contact point 23, a positive fit could of course also be implemented. For this purpose, support notches, for example in the form of fine teeth, into which a part of the lifting part 20, e.g. an edge or a tooth, engages, could be provided on the part of the support structure 7 that engages with the lifting part 20. The support notches can be designed in such a way that, when the brake caliper 2 is applied, the lifting part 20 is pulled over the support notches. When the lifting part 20 is rotated, it can latch into the support notches and thus produce a positive locking, which again creates a support for the lifting part 20.

It is also possible for the lifting part 20 to be completely lifted off the support structure 7 by the lifting drive 22 when the brake caliper 2 is applied in order to avoid any loss or wear associated therewith. Only when both brake pads 4, 5 are in contact with the brake disk 3, could the lifting part 20 be moved toward the support structure 7 until the lifting part 20 abuts at the contact point 23. The lifting part 20 can also always be lifted off the support structure 7 and only be moved to the support structure 7 to make contact, for example by means of the lift drive 22, in order to produce the movement to move the brake caliper 2 for lifting the first brake pad 4.

Figure 2:
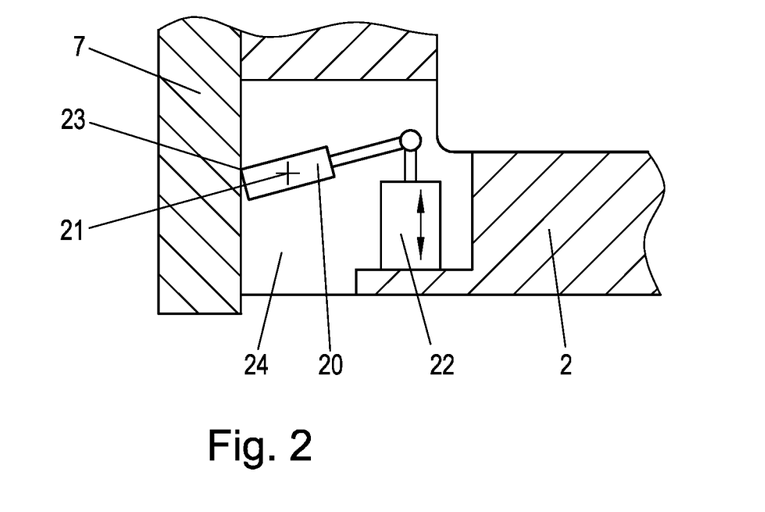

The lift drive 22 does not necessarily have to produce a rotary movement in order to rotate the lifting part 20 at the hinge point 21. A possible advantageous embodiment of the lifting part 20 could be in the form of a lever, as shown in FIG. 2. The lifting part 20, which is lever-shaped in this embodiment, is hinged to the brake caliper 2 at the hinge point 21. A first end of the lever-shaped lifting part 20 abuts the support structure 7 at the contact point 23 (at least during the lifting of the first brake pad 4) in order to form the support for moving the brake caliper 2. On the opposite lever arm, for example on the second, opposite end, of the lifting part 20, the lift drive 22, for example a linear drive, engages in order to pivot the lifting part 20 about the hinge point 21. The function of this embodiment is of course the same as described above for FIG. 1.

In certain embodiments of the floating-caliper brake 1, it can be advantageous if more than one lifting part 20 is provided. If the brake caliper 2 is guided, for example, in a plurality of caliper guides 9, such as in two guide pins 8 in the embodiment according to FIG. 1, then a lifting part 20 is provided preferably for each, or at least for more than one, support structure 7 as a caliper guide. Preferably, enough lifting parts 20 are provided so that it is possible for the brake caliper 2 to move evenly and safely without the brake caliper 2 being tilted or jammed in a caliper guide 9. A lift drive 22 can be provided for each lifting part 20, or a lift drive 22 drives a plurality, preferably all, of the lifting parts 20 at the same time.

Another particular advantage of the arrangement of the lifting part 20 on the brake caliper 2 is that the lifting part 20, preferably together with the lift drive 22, can be properly enclosed from the outside. The brake caliper 2 could have a corresponding recess 24 for receiving the lifting part 20 and possibly the lift drive 22, which is suitably closed to the outside, for example by covers or seals, etc. Due to this, the lifting part 20 and optionally the lift drive 22, can be properly enclosed from external influences in the vicinity of the floating-caliper brake 1, for example moisture, ice, snow, dirt, small solids (e.g. small stones, etc.), which of course significantly increases the operational reliability.

In a particularly advantageous embodiment, the pressing device 6, or the pressing drive 13 of the pressing device 6, simultaneously serves as a lift drive 22. For this purpose, the movement of the pressing device 6, which is already present, can be used in any way to rotate the lifting part 20.

Figure 3:
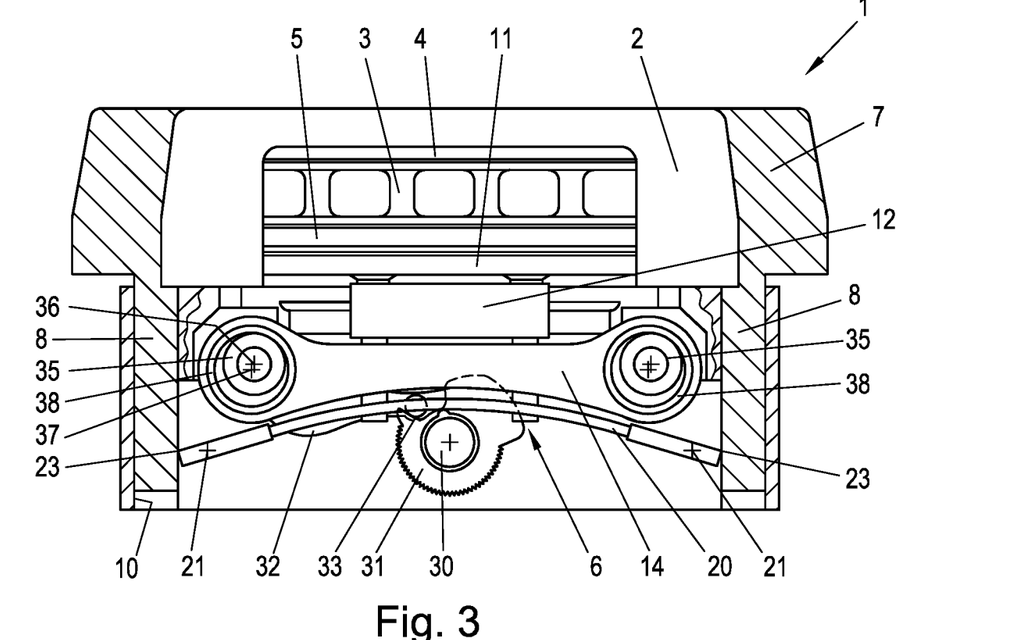

A particularly advantageous embodiment of a floating-caliper brake 1 having a reliable lift of the two brake pads 4, 5 after braking is shown in FIG. 3. The same parts as in FIG. 1 are given the same reference numerals in FIG. 3 and their functions are only explained again where necessary. The pressing device 6 is implemented in this embodiment as described by the applicant in WO 2014/139919 A1. The pressing device 6 is designed electromechanically and includes a cam disk 31 which can be driven and thus rotated by an electric motor 30 (as a pressing drive 13). A follower element 33 (for example a rotatably mounted roller) is arranged on a coupling member 32 and follows the elevation curve 34 of the cam disk 31 when the cam disk 31 is rotated by the electric motor 30. At each end of the coupling member 32 a lever (not visible in FIG. 3) is hinged, which, in each case, is connected to a drive shaft 35 which is rotatably mounted in the brake caliper 2. The coupling member 32 is moved by the movement of the follower element 33 and the levers hinged thereon are pivoted, as a result of which the drive shafts 35 are rotated about their bearing 36. The coupling member 32 together with the two levers thus form a parallelogram drive, which enables simple and reliable synchronization of the drive shafts 35. At least one eccentric shaft journal 38, preferably one at each end of the drive shafts 35, is provided on each of the drive shafts 35. The axis of rotation 37 of the shaft journal 38 is arranged eccentrically with respect to the axis of rotation of the bearing 36. The pressing part 14 (possibly also the holding part 11 directly) is mounted on the eccentric shaft journal 38. If the pressing shaft 35 is rotated as described, the pressing part 14, or the second brake pad 5 arranged thereon, is moved toward the brake disk 3 or away from it, depending on the direction of rotation of the cam disk 31, due to the eccentricity of the shaft journal 38. Thus, a brake pad 5, which is arranged on the pressing part 14, here via the wear adjuster 12 and a holding part 11, can be moved to the brake disk 3 in order to brake, or lifted off from the brake disk 3 in order to release the floating-caliper brake 1.

It should be noted, however, that this embodiment of the pressing device 6 for brake actuation is of course only an example and, for the principle according to the invention of lifting the pad by means of the lifting part 20, the pressing device 6 can be designed in any other way, in particular by means of eccentrics, levers, wedges, screws, rods, gears or media such as liquids or gases.

In the embodiment shown, the entire pressing device 6 is arranged in an enclosed manner in the interior of the brake caliper 2, for example in a corresponding recess, and can thus be easily enclosed from the outside. In this way, the pressing device 6 can be properly sealed off from external influences in the vicinity of the floating-caliper brake 1, for example moisture, ice, snow, dirt and small solids (e.g. small stones, etc.), which significantly increases the operational reliability of the floating-caliper brake 1.

In addition, a lifting part 20 is arranged in the brake caliper 2 of the floating-caliper brake 1 of FIG. 3. The lifting part 20 is designed as a bracket which is rotatably hinged to the brake caliper 2 in the region of its two opposite ends in each case at a hinge point 21. The position of the hinge points 21 is of course selected such that the resulting supports result in favorable transmission ratios for moving the brake caliper 2. The lifting part 20 is clamped between the two hinge points 21 such that the lifting part 20 bends in the direction of the brake disk 3. The bending also results in a certain prestress in the direction of the support structure 7. The two axial ends of the lifting part 20, as described above, abut the support structure 7 at contact points 23, in this case the guide pin 8 of the caliper guide 9, and are supported thereon. The function of this lifting part 20 is explained below with reference to FIGS. 4 and 5. It should be pointed out, however, that the function of this lifting part 20 would also be analogous for any other possible embodiment of the pressing device 6. The specific design of the pressing device 6 is therefore irrelevant to the function of the lifting part 20.

Figure 4:
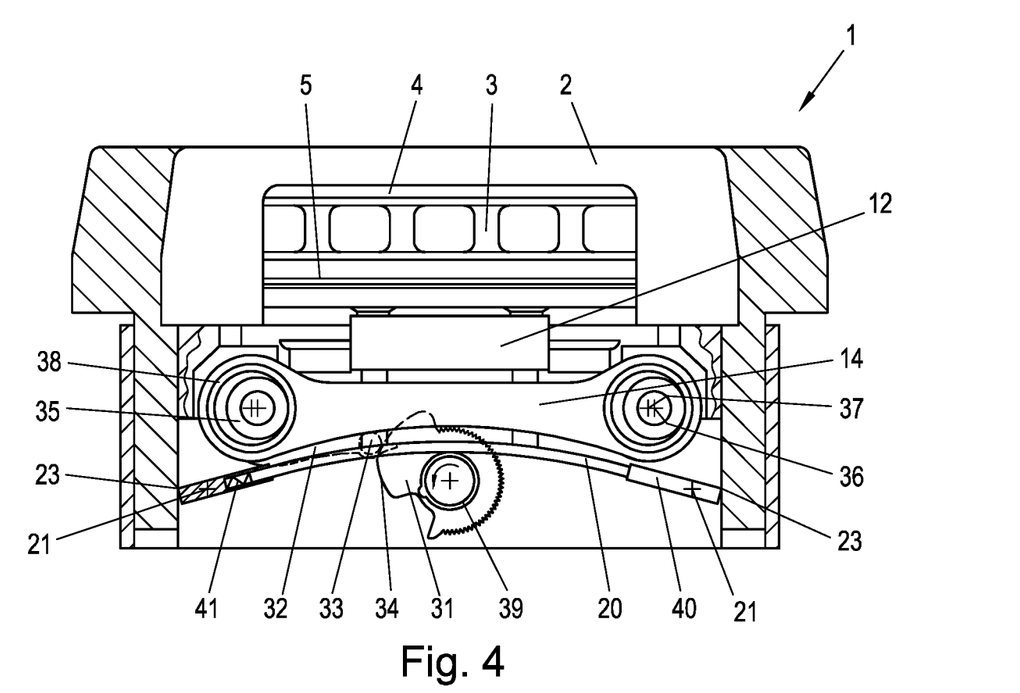

FIG. 4 shows the floating-caliper brake 1 in the actuated state in which the two brake pads 4, 5 are pressed against the brake disk 3 by the pressing device 6. For this purpose, the cam disk 31 is rotated counterclockwise, for example, and the follower element 33 moves along the elevation curve 34 of the cam disk 31 and thus pivots the drive shafts 35, which, due to the eccentricity, leads to the actuation movement of the pressing part 14. The lifting part 20 is moved in the transverse movement of the brake caliper 2 as well due to the mounting at the hinge points 21, as a result of which the contact points 23 move on the support structure 7. The lifting part 20 is thus centered as described above.

Figure 5:
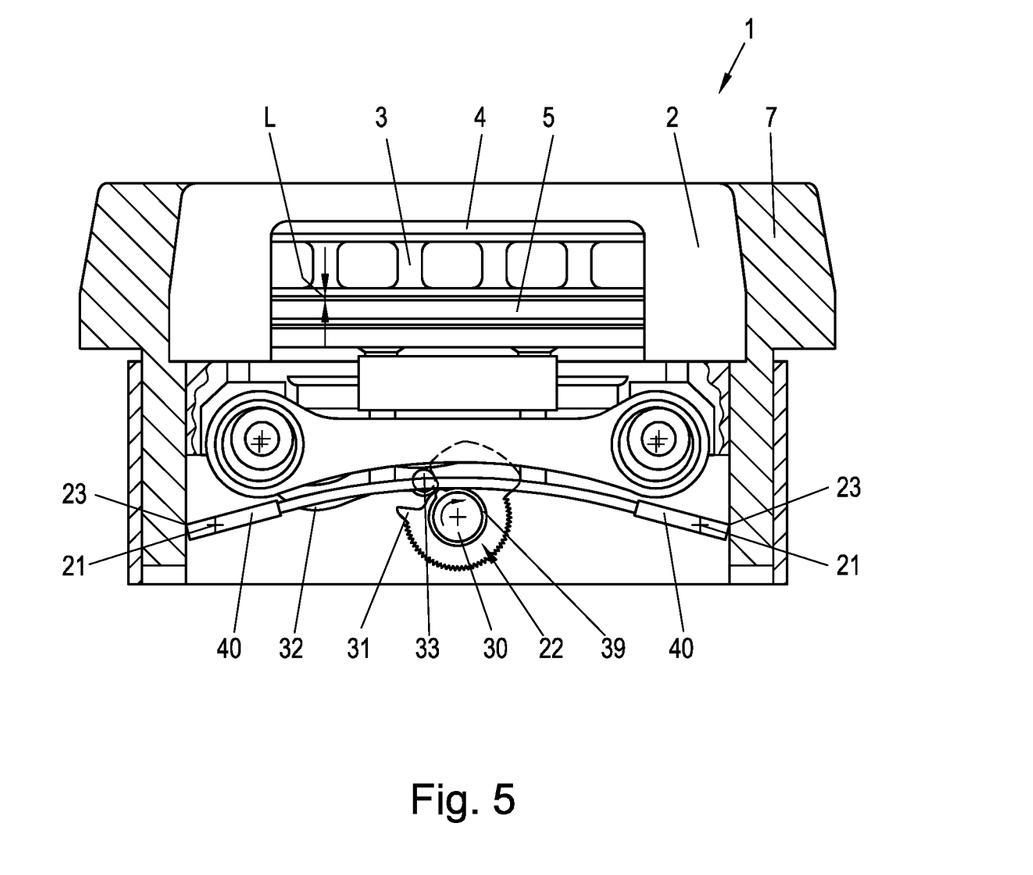

In order to release the floating-caliper brake 1, the cam disk 31 is rotated back again in the opposite direction, i.e. clockwise, as shown in FIG. 5. In this way, the second brake pad 5, coupled to the pressing device 6, is lifted off the brake disk 3, resulting in an air gap L. The pressing drive 13 of the pressing device 6 (in this case the electric motor 30) is used in this embodiment simultaneously as a lift drive 22 for actuating the lifting part 20. For this purpose, not only is the cam disk 31 driven and rotated by the electric motor 30, but also a cam 39. Of course, an independent lift drive 22 could also be provided. The cam 39 is arranged such that, when the cam 31 disk is rotated back into the initial position (i.e. when the floating-caliper brake 1 is released), in which the follower element 33 latches, for example, in a rest position, the cam 39 comes into engagement with the lifting part 20 toward the end of the return movement and bends it further because of the elevation of the cam 39. For this purpose, the cam 39 engages approximately in the middle of the lifting part 20. By bending the lifting part 20, the lifting part 20 is rotated about the hinge points 21 and the hinge points 21 (and thus the brake caliper 2) are forcibly moved because the contact points 23 on the support structure 7 act as a support. In the exemplary embodiment in FIG. 5, they are moved upward. As a result of this movement, the brake caliper 2, connected to the hinge points 21, is inevitably also moved. In this way, the first brake pad 4 arranged on the brake caliper 2 can be lifted off the brake disk 3 in a controlled manner, as shown in FIG. 3, which shows the initial position of the floating-caliper brake 1.

Due to the centering of the lifting part 20 in the actuated state of the floating-caliper brake 1, i.e. when both brake pads 4, 5 abut the brake disk 3, a controlled lifting of both brake pads 4, 5 by a desired amount can always be achieved.

It is obvious that by appropriate dimensioning and arrangement of the lifting part 20 and the lift drive 22, or the pressing device 6, the lifting can be easily adapted to the needs of the particular floating-caliper brake 1. For example, a cam 29 of the pressing device 6 as a lift drive 22 could also rotate the lever-shaped lifting part 20 from FIG. 2, or the pressing device 6 or a movement coupled therefrom could also rotate the lifting part 20 directly.

At the axial ends of the lifting part 20 which abut the support structure 7, materials can of course be used which cause little wear on the support structure 7. For example, sleeves 40 made of plastics material could be provided at the ends of the lifting part 20. The lifting part 20 itself could also be made of plastics material.

In order to increase the pressing force at the contact point 23 in the event of a frictional locking between the lifting part 20 and the support structure 7, a spring 41 can also be arranged between the sleeve 40 and the lifting part 20, as shown in FIG. 4. A spring 41 at one end can be sufficient, or a spring 41 can be provided at both ends. Likewise, the lifting part 20 can also be pressed against the support structure 7 using a spring.

For example, a moving force of 50 N could be required for a floating-caliper brake 1 in a vehicle in order to be able to move the brake caliper 2 with usual mass reliably even during normal cornering. If one also assumes a coefficient of friction between the lifting part 20, or the sleeve 40, and the support structure 7 of 0.15 (which e.g. certain plastics materials can achieve on greased steel), one would arrive at a necessary contact pressure of, for example, 333 N on a friction pairing (lifting part 20 or sleeve 40/support structure 7). If a plurality of lifting parts 20 are provided, or the coupling part is designed as in FIG. 3, then the moving force can of course be divided accordingly, as a result of which the necessary contact pressure for the frictional locking is also reduced accordingly, i.e. in this example to 166.5 N. In order to achieve these pressing forces, a spring can be used for support if necessary.

Of course, the lifting part 20 does not have to abut the support structure 7 at the contact point 23 during the entire actuation of the floating-caliper brake 1. In principle, it is sufficient if the lifting part 20 only abuts the support structure 7 when the floating-caliper brake 1 has been actuated, that is, when the two brake pads 4, 5 abut the brake disk 3 for braking, in order to preferably center the lifting part 20. The exact time point when the lifting part 20 abuts the support structure 7, for example shortly before both brake pads 4, 5 abut or at maximum tension, is, however, irrelevant. The lifting part 20 could also abut the support structure 7 only together with or during the release of the second brake pad 5 or even only after the second brake pad 5 has been completely lifted off the brake disk 3 by means of the pressing device 6, or at some point in between. It is only important that the lifting part 20 abuts the contact point 23 for a certain time period at some point during the release of the floating-caliper brake 1 and that the lift drive 22 moves the lifting part 20 during this time period such that the lifting part 20 moves the brake caliper 2 via the resulting support at the contact point 23 and the hinge point 21 relative to the support structure 7. In this way, the brake caliper 2 together with the first brake pad 4 can also be lifted before the second brake pad 5 and/or simultaneously with the second brake pad 5 when the floating-caliper brake 1 is released. How the lifting part 20 is lifted from the support structure 7 or how the lifting part 20 abuts the support structure 7 is actually implemented is irrelevant. This is preferably carried out by means of the lift drive 22 or the pressing device 6 (as a lift drive 22), for example as described, via the elevation curve of a cam 39 or a plurality of cams. In the embodiment according to FIG. 3, for example, a second cam or a corresponding elevation curve of the cam 39 could be provided, which lifts the lifting part 20 from the support structure 7 while the floating-caliper brake 1 is applied.

The specific design of the lifting part 20 is also irrelevant to the invention. It is only important that the lifting part 20 is hinged to the brake caliper 2 at a hinge point 21 and, at least in order to lift the first brake pad 4 from the brake disk 3, abuts a contact point 23 on the support structure 7 to form a support and is moved by a lift drive 22 in order to lift such that the contact point 23 acts as a support for the lifting part 20 and the brake caliper 2 is moved over the hinge point 21.

The brake caliper can of course also generally be seen as a clamping part of the friction surfaces, with the result that the invention can also be applied equally to multiple disk and multi-disk brakes, whereas the number of friction surfaces being arbitrary. The friction surfaces of a floating-caliper brake 1 do not have to be disk-shaped either, but rather they can have any useful geometry, for example straight or curved surfaces. Vehicles of all kinds as well as machines, devices, propellers, lifting devices, etc. can be braked. The invention can even be applied to internal or external shoe brakes by the shoe carrier (which is then equivalent to the brake caliper) being designed according to the invention such that both shoes can be lifted with the desired movement.

The invention claimed is:

1. A floating-caliper brake, comprising a brake caliper floatingly mounted on a support structure of the floating-caliper brake, on which brake caliper a first brake pad and a pressing device are arranged, wherein a second brake pad being arranged on the pressing device and the pressing device moving the second brake pad toward the first brake pad in order to actuate the floating-caliper brake and moving the second brake pad away from the first brake pad in order to release the floating-caliper brake, wherein a lifting part is hinged to the brake caliper at a hinge point, and the lifting part is supported on the support structure at a contact point at least partly at releasing the floating-caliper brake, wherein a lift drive is provided which rotates the lifting part about the hinge point such that a support for the lifting part is produced at the contact point, whereby the hinge point and the brake caliper are moved.

2. The floating-caliper brake according to claim 1, wherein, when the floating-caliper brake is actuated, the lifting part abuts the support structure at the contact point until the floating-caliper brake is completely released.

3. The floating-caliper brake according to claim 1, wherein, during actuation and release, the lifting part abuts the support structure at the contact point, whereas the contact point being moved on the support structure when the floating-caliper brake is actuated.

4. The floating-caliper brake according to claim 1, wherein a plurality of lifting parts are arranged on the brake caliper, which parts each abut the support structure at a contact point and are actuated by one or more lift drives.

5. The floating-caliper brake according to claim 1, wherein a lifting part is hinged to the brake caliper at two hinge points, and each end of the lifting part is supported on the support structure at a contact point at least partly at re-leasing the floating-caliper brake and the lift drive rotates the lifting part about the two hinge points.

6. The floating-caliper brake according to claim 1, wherein the pressing device is also used as a lift drive.

7. The floating-caliper brake according to claim 1, wherein a caliper guide for guiding the brake caliper is provided on the support structure and the lifting part abuts the caliper guide at the contact point.

8. The floating-caliper brake according to claim 7, wherein the caliper guide is designed as a guide pin which is arranged in a guide hole of the brake caliper.

* * * * *